United States Patent [19]

Miley

[11] 3,886,483
[45] May 27, 1975

[54] PLASMA PUMPED LASER
[75] Inventor: George H. Miley, Champaign, Ill.
[73] Assignee: The United States of America as represented by the United States Energy Research and Development Administration, Washington, D.C.
[22] Filed: Oct. 31, 1973
[21] Appl. No.: 411,556

[52] U.S. Cl. ............................................ 331/94.5 P
[51] Int. Cl. ............................................ H01s 3/09
[58] Field of Search .................... 331/94.5 P; 176/1

[56] References Cited
OTHER PUBLICATIONS
"Nuclear Pumped Gas Lasers," by K. Thom et al., AIAA 9th Aerospace Sciences Meeting, 1/25–1/27/71, AIAA Paper No. 71-110, pgs. 1–16.
"Pumping & Enhancement of Gas Lasers Via Ion Beams," by Miley et al., Rec. of 11th Sympos. on Electron, Ion & Laser Tech., 5/11/71.
"Gas Laser Excitation with a Relativistic Electron Beam," by Miley, Rec. of 11th Sympos. on Electron, Ion & Laser Tech., 5/11/71.

Primary Examiner—Ronald L. Wibert
Assistant Examiner—Paul K. Godwin
Attorney, Agent, or Firm—John A. Horan; Arthur A. Churm; Walter L. Rees

[57] ABSTRACT
This invention relates to a laser and in particular to a laser utilizing a plasma to create a population inversion in the laser active medium. The laser can be pumped by the output plasma from a fusion reactor, for example, or by plasma from other sources. Either the plasma ions or electrons or both can be used to pump the laser. Also the plasma ions can be used to provide energy to achieve a chemical laser action.

11 Claims, 7 Drawing Figures

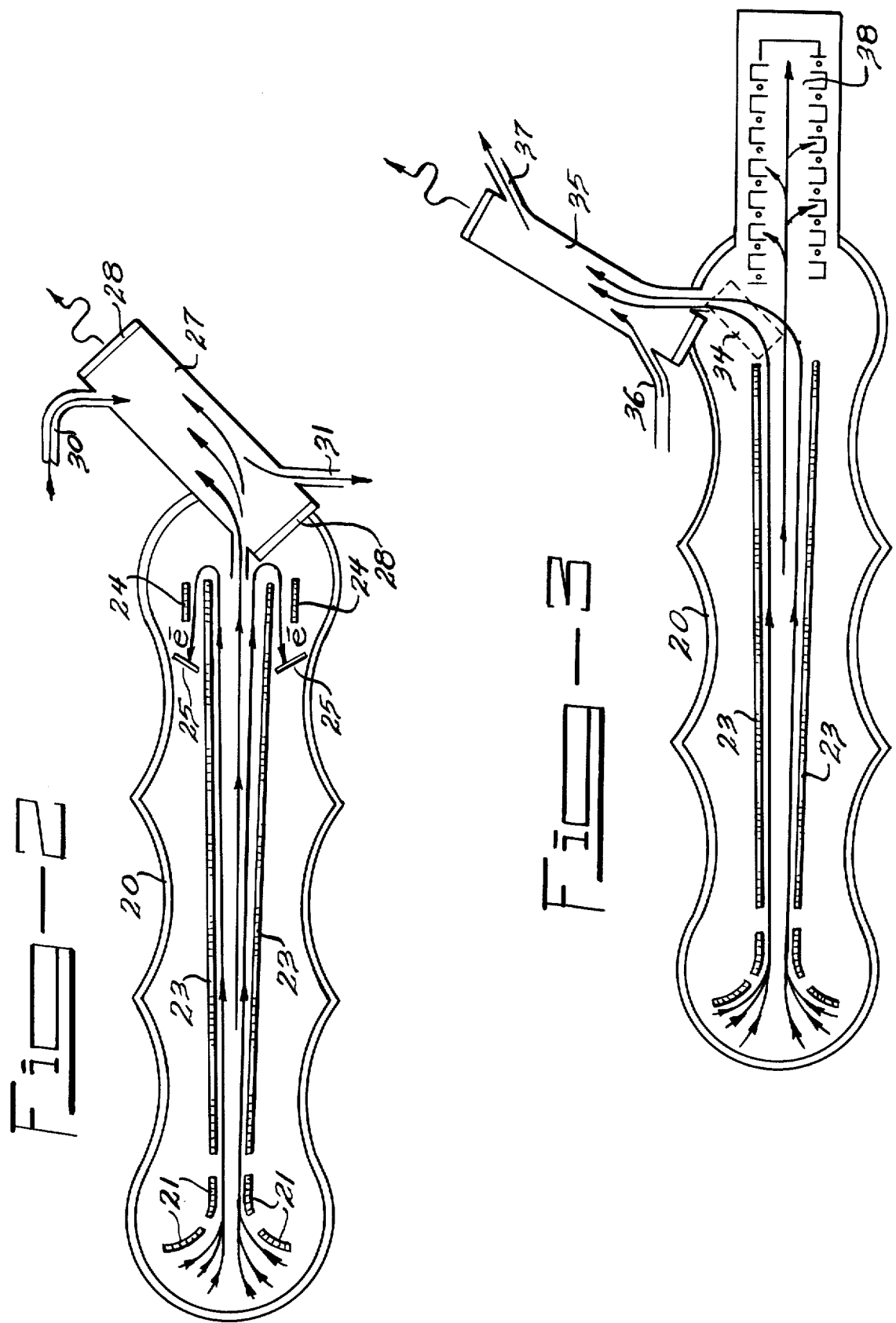

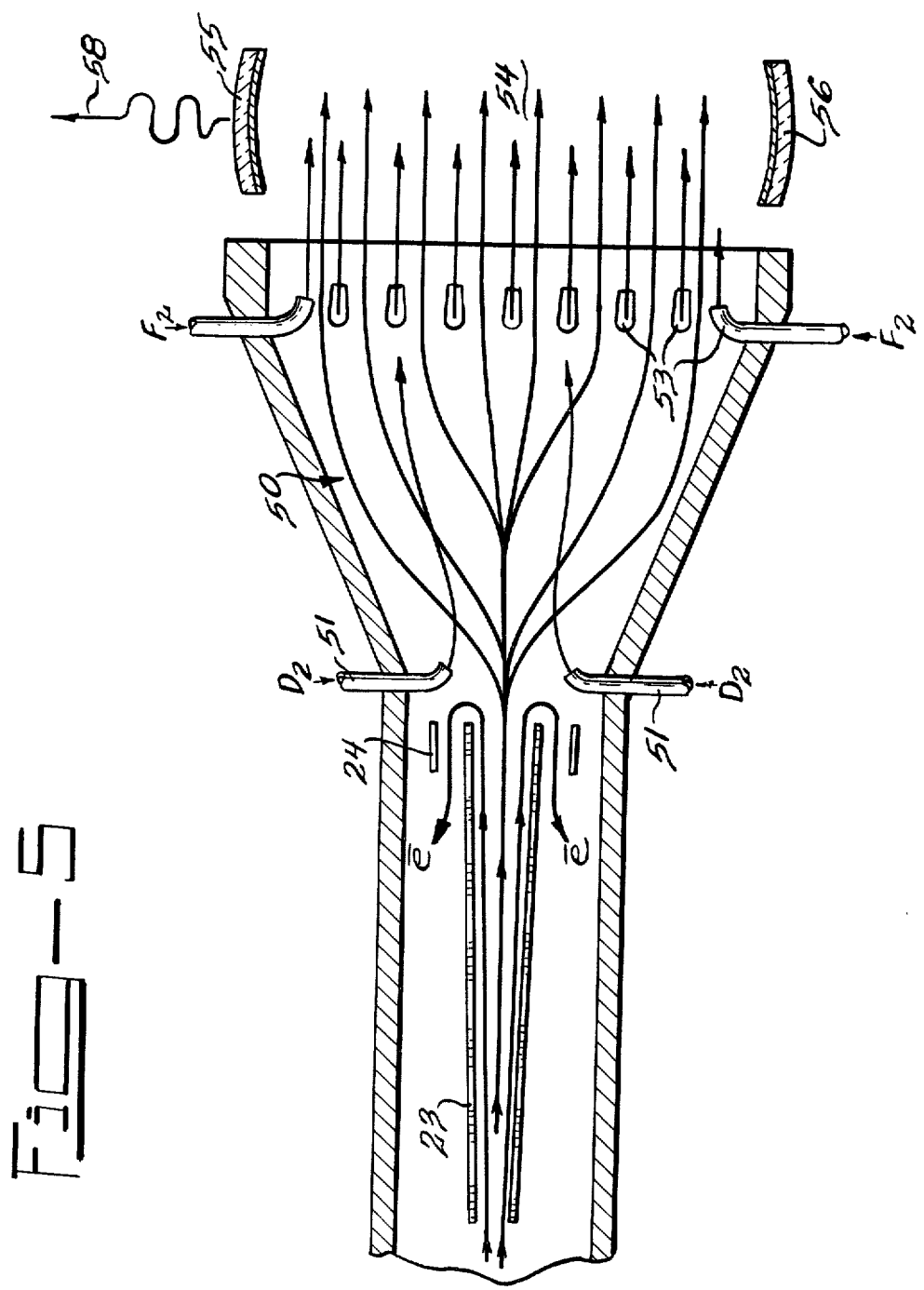

PLASMA PUMPED LASER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In order to produce coherent radiation, from a laser active medium, it is necessary to pump the laser active medium with energy to establish a population inversion in the laser active medium. There have been many ways of accomplishing this. For example, noncoherent radiation is supplied to the laser active medium by means of a flash lamp or electric energy is applied directly to the laser active medium. The amount of energy which can be supplied to the laser active medium by these means is limited and providing more powerful laser radiation has been a problem.

Most designs of fusion reactors to date have concentrated on the conversion of the output to electrical energy, either by the direct conversion of the plasma to electric energy or by the conversion of the plasma energy to heat, which is then converted into electric energy by conventional thermal generating plants. It would be desirable to be able to convert all or a portion of the energy output of a fusion reactor directly into coherent radiation. This could provide more powerful lasers for various purposes and also could provide means of transmitting the energy over long distances through the narrow beams possible with coherent radiation. One form of a fusion reactor uses coherent radiation to initiate a D-D, D-He$^3$, or D-T fusion reaction. A portion of the plasma developed in this manner can be used to develop coherent radiation to initiate another fusion reaction. Power which would otherwise be wasted, such as the charged particles in a toroidal device diverter, can be used to produce coherent radiation. The high energy output can also be used to separate isotopes.

It is therefore an object of this invention to provide an improved means of pumping a laser.

Another object of this invention is to provide a laser pumped by the plasma output from a plasma generating device.

SUMMARY OF THE INVENTION

In practicing this invention, a laser active medium is provided in a laser cavity. For example, the laser active medium may be a gas, such as $CO_2$, which is pumped through a laser cavity in a known manner. Plasma from a fusion reactor or other plasma source is separated into electrons and ions by magnetic separation. The laser medium is then mixed with the electron beam or the ion beam in the laser cavity to pump the laser medium. When sufficient energy is transferred to the laser active medium, coherent radiation will be initiated.

In another form of this invention, the plasma is not separated into electrons and ions but is used directly to pump the laser active medium. By properly choosing the gases which are mixed with the ion beam, a chemical reaction can be initiated which will provide a pumped laser active medium.

BRIEF DESCRIPTION OF THE DRAWINGS

The invention is illustrated in the drawings of which:

FIG. 2 is a drawing showing a plasma pumped laser of this invention using ions to pump the laser;

FIG. 3 is a drawing showing a plasma pumped laser using electrons for pumping;

FIG. 5 is a drawing showing the invention used to initiate chemical reaction to pump the laser medium;

DESCRIPTION OF THE INVENTION

Figure 1:
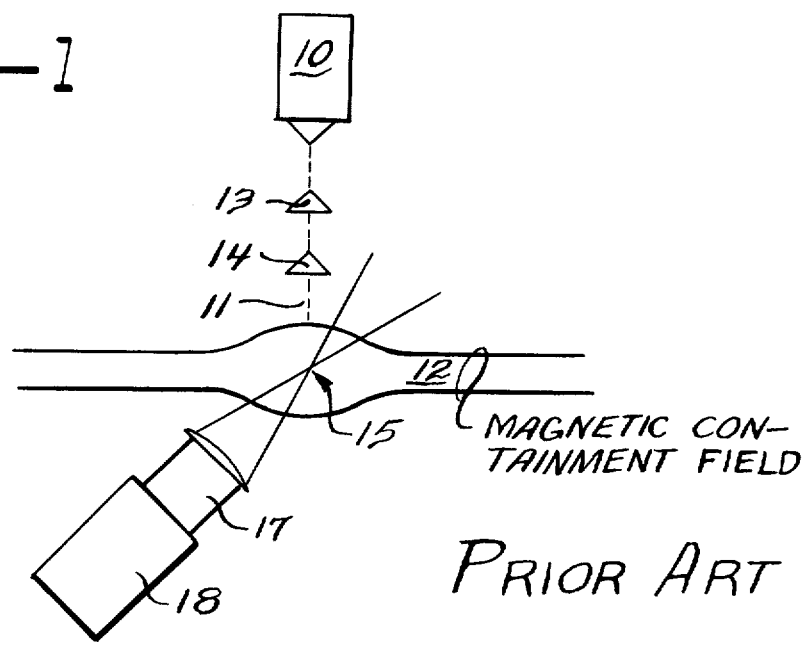
FIG. 1 is a drawing showing a prior art device for creating a plasma.

In this invention, a plasma source, such as a fusion reactor or other type of plasma source, is used to pump laser material to develop a population inversion in the laser material. An example of a plasma source suitable for use in the plasma pumped laser of this invention can be found in U.S. Pat. No. 3,723,703 of Ehlers et al., issued Mar. 27, 1973. Referring to FIG. 1, the apparatus of the Ehlers et al. patent is illustrated. This device comprises a hydrogen pellet supply mechanism 10 which selectively drops solid hydrogen (deuterium-tritium) pellets to be energized from the lower end thereof. The pellets fall by gravitational force along line 11 into a magnetic containment field (indicated at 12) which is produced by coils. A pair of collimators 13 and 14 are positioned along the pellet fall line 11 and function to eliminate any pellets not exactly in line with the focal point 15 line at a central point within the magnetic field 12. Focal point 15 is the focal point of a lens system 16 which is positioned to focus a laser beam 17 from a high power laser 18 at focal point 15. When a pellet from supply mechanism 10 is dropped along line 11 through collimators 13 and 14 and passes through the focal point 15, the pellet is energized by the high powered laser beam 17. The laser beam 17 initiates a reaction within the magnetic containment field 12 whereby the hydrogen pellet is formed into a plasma. The energy in the plasma can be further increased by "pinching" the plasma in a known manner.

Other devices for forming a plasma with sufficient energy to pump a laser make use of a magnetic "pinch" effect in a toroidal confinement device. A plasma can also be generated by the adiabatic compression of a plasma in a magnetic mirror containment device. These devices are well known in the art and any of the many well-known devices can be used to generate a suitable plasma. For example, the Scylla and Scyllac devices at Los Alamos Scientific Laboratories have produced plasmas having temperatures of 1 kev with plasma densities of $10^{16}$ particles per $cm^3$. Other plasma generating devices are described in the publication *Project Sherwood, the U.S. Program in Controlled Fusion*, by Amasa S. Bishop, Addison-Wesley Publishing Company, Inc., 1958.

Referring to FIG. 2, there is shown a laser having the features of this invention. The output section 20 of a magnetic containment portion of a plasma generator is shown. The plasma ions and electrons are directed by magnetic coils 21 into an expander 23. In expander 23, the magnetic intensity decreases from the entrance to the exit to change the spiral motion of the ions and electrons around the magnetic field lines to a more direct motion. The ratio of the magnetic field intensity at the exit of the expander to the magnetic field intensity at the entrance to the expander is made small to collimate the charged-particle beam exiting the expander.

At the exit of the expander magnetic field coils 24 are used to separate the electrons from the ions. The electrons can be removed by placing suitable targets 25 in the electron beam. The ions have a very large momentum compared to the electrons and are able to jump across the magnetic field lines which divert the electrons and thus the ions can be directed into a laser cavity 27 including mirrors 28. The expansion reduces the ion-beam density to a value where space charge blow-up is not restrictive. Then to maintain reasonable collimation, the length of the laser should satisfy the condition $\omega_{pi}\tau<1$ where $\omega_{pi}$ is the ion plasma frequency and $\tau$, the average resonance time, is the laser length along the beam path divided by the ion speed.

Laser cavity 27 also includes an inlet 30 to introduce a laser material in the form of gas into the laser cavity 27. An outlet 31 is also provided to permit the exit of the laser material after lasing action has taken place. The laser active medium mixes with the ions so that a population inversion is developed in the laser medium and coherent radiation is developed.

Laser 27 can be, for example, a $CO_2$ gas laser operating in a conventional manner in which $CO_2$ gas continuously flows through the laser cavity. Laser cavity 27 may also include a water cooling jacket (not shown) if this is required. The construction and operation of $CO_2$ and other gas lasers is well known in the art. For example, a relatively small (200 MWe) mirror reactor such as is described in *Engineering and Economic Aspects of Mirror Reactors with Direct Conversion*, by R. W. Werner et al., UCRL-72883, Livermore Radiation Laboratory, May 1971, develops ion and electron currents in the expander of approximately 750 MW and 80 MW, respectively. Approximately 10 to 30 percent of this energy can be converted to coherent radiation.

Referring to FIG. 3, there is shown another form of this invention in which electrons are used to pump a laser instead of the ions. In the structure shown in FIG. 3, the plasma is removed from the containment device through expander 23 as previously described. At the exit of expander 23, a magnetic field perpendicular to the drawing and produced by a magnetic field structure (indicated at 34) bends the electrons and directs them into the laser cavity 35. Laser cavity 35 also includes the inlet port 36 and exit port 37 for providing a flow of laser active medium, such as $CO_2$ gas, through the laser. As previously described, the ions, having a much larger momentum than the electrons, jump the magnetic field and are directed to a suitable target material, or as shown in FIG. 3, a collector 38 for direct conversion of the ions to an electric current in a manner known in the art. By this means, the electrons which might otherwise not be usable, are utilized to pump a laser. For example, the laser may be used to initiate the plasma generation process as described in connection with the plasma generation structure of FIG. 1.

Figure 4:
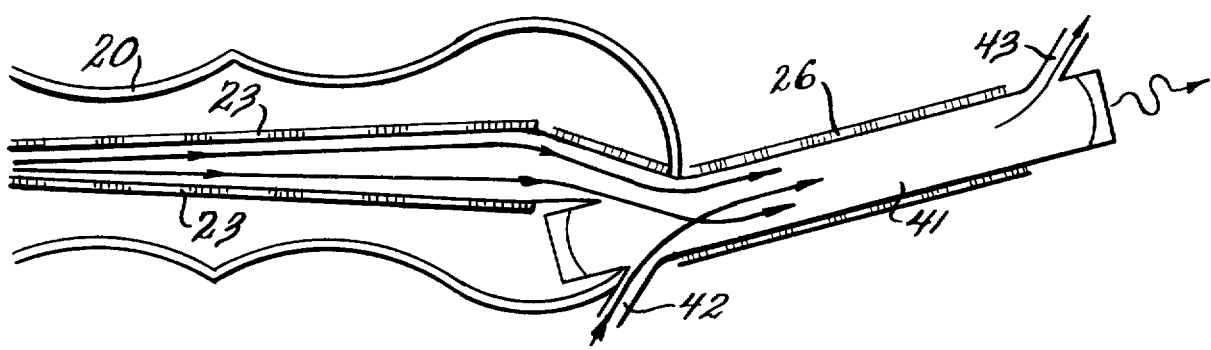
FIG. 4 is a plasma pumped laser in which both ions and electrons are used.

In FIG. 4, there is shown a plasma pumped laser 41 in which there is no separation of the ions and electrons at the output of the expander 23. The gas which is the laser material flows into laser cavity 41 through inlet 42 and out through outlet 43. In the structure of FIG. 4 both ions and electrons are directed into the laser cavity. In this case the magnetic field lines from the expander are continued through the laser cavity using field coil 26. The energy of the ions and electrons is transferred to the laser active medium, for example $CO_2$ gas, to pump the laser active medium and to provide the required energy for a laser action.

There are also chemical laser systems which can be pumped using the energy in a plasma. The table below gives a summary of some of the well-known chemical laser systems.

| System | Reactions | Active laser molecule | Output$\lambda$ $\mu m$ |
|---|---|---|---|
| 1. $H_2-F_2$ | $F + H_2 \rightarrow HF + H$ | HF | 2.6 to 3.5 |
|  | $H + F_2 \rightarrow HF + F$ | HF | 2.6 to 3.5 |
| 2. $D_2-F_2$ | $F + D_2 \rightarrow DF + D$ | DF | 3.6 to 5.0 |
|  | $D + F_2 \rightarrow DF + F$ | DF | 3.6 to 5.0 |
| 3. $DF-CO_2$ | $F + D_2 \rightarrow DF + D$ | $CO_2$ | 10.6 |
|  | $D + F_2 \rightarrow DF + F$ |  |  |
|  | $DF + CO_2 \rightarrow DF + CO_2$ |  |  |
| 4. $CS_2-O_2$ | $O + CS_2 \rightarrow CS + SO$ | CO | 4.9 to 5.7 |
|  | $SO + O_2 \rightarrow SO_2 + O$ |  |  |
|  | $O + CS \rightarrow CO + S$ |  |  |
|  | $S + O_2 \rightarrow SO + O$ |  |  |

Referring to FIG. 5, there is shown a structure for carrying out a chemical laser action using the plasma energy. The device illustrated in FIG. 5 uses the $D_2-F_2$ reaction as an illustrative example. The required $D_2$ gas is injected into the exhaust plasma through injectors 51. The gas and exhaust plasma are expanded through nozzle structure 50 and are mixed. At some distance downstream, the plasma energy acts to disassociate the $D_2$, producing atomic deuterium. At this point, $F_2$ is injected through the injection nozzles 53 to obtain proper velocities and mixing. The reaction indicated in the table then proceeds to develop the pumped laser material DF which passes into the laser cavity 54 between mirrors 55 and 56. When the laser material is in the laser cavity 54, the lasing action takes place to develop a coherent light output 58. While the structure has been shown for only a deuterium/fluorine reaction, the plasma energy can be used to carry out any of the reactions shown in the table by introducing the proper gases at the inlet nozzles 51 and 53. For example, in reaction 3, the $D_2$ would be introduced at nozzles 51 and the $CO_2$ and $F_2$ at nozzles 53. In reaction 4, both the $CS_2$ and $O_2$ would be introduced at nozzles 51 and nozzles 53 would not be used.

Figure 6:
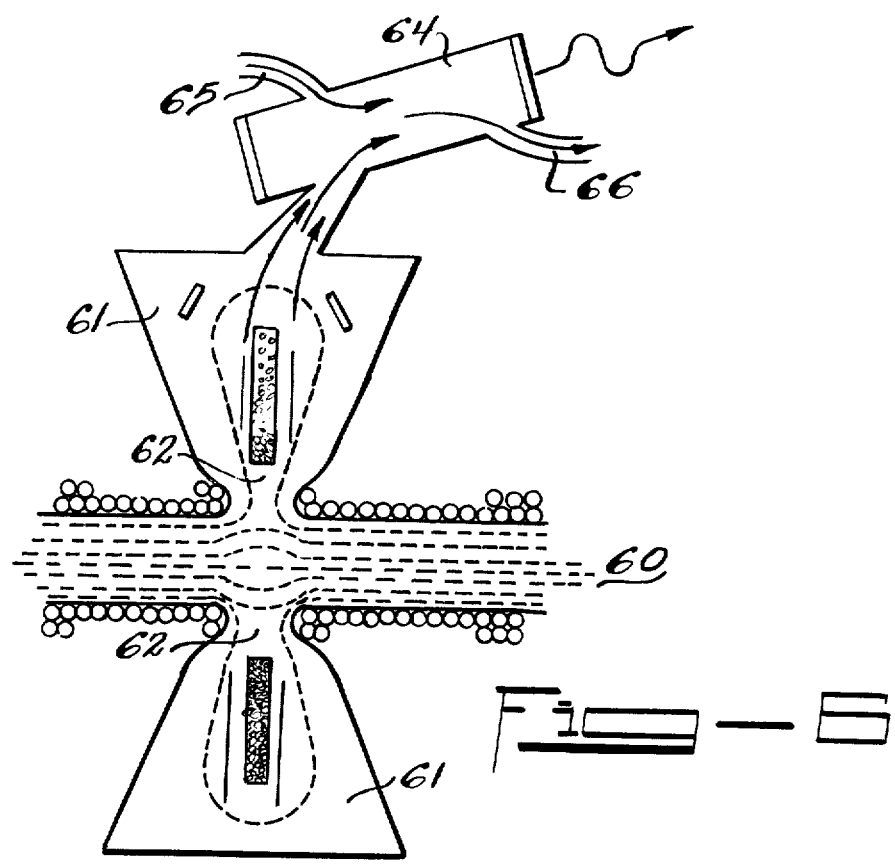
FIG. 6 shows the use of charged particles from a diverter to pump a laser active medium.

In FIG. 6, there is shown a structure which can be used to utilize the otherwise wasted energy from toroidal type plasma containment devices, such as a simple toroid or the Stellarator and Tokamak devices. The discharge tube 60 has coupled to it in a known manner the diverter structure 61. As is well known, the diverter consists of a large chamber encircling the discharge tube at some convenient location and connected to it by a small opening 62. By means of a system of coils in the region of this opening, the magnetic flux (shown as dashed lines in FIG. 6) adjacent to the walls of the discharge tube are diverted through the openings 62 and into the large chamber of the diverter. Charged particles of the plasma diffusing slowly outward across the magnetic field will eventually reach the outermost lines of magnetic flux and be diverted into the chamber 61. A diverter is used so that these charged particles which have diffused out to the edges of the magnetic field will not strike the walls of the discharge tube to produce impurities which adversely affect the containment of the plasma in the toroidal structure. The energy of the charged particles in the diverter is normally given up as heat as the charged particles strike the walls of the diverter chamber. In this example, however, the charged particles are directed into a laser cavity structure 64 where a laser active medium, such as $CO_2$ gas, is inserted through inlet 65 and is exhausted through outlet 66. By this means, the otherwise wasted energy of the charged particles in the diverter chamber can be used to pump the laser active medium in the laser cavity 64.

The exhaust from a fusion reactor (either from an open ended system such as a mirror containment system or from a toroidal system) will consist of a high-temperature plasma. The energy in the high-temperature plasma is normally to be used as a source of heat energy in a conventional heat engine or to develop electricity directly. The structures shown in this invention provide for the direct transfer of the energy to coherent radiation from a laser without the need for intermediate electrical equipment. This also provides for the production of coherent radiation which may be back into the fusion reactor system to initiate a fusion reaction by means of a laser beam. Either the electrons or ions or both can be used. Ions interact with the inner core electrons of the laser material to raise the laser medium to higher excitation states than can be done with electrons. This makes it possible to develop a coherent light output of a higher frequency.

Figure 7:
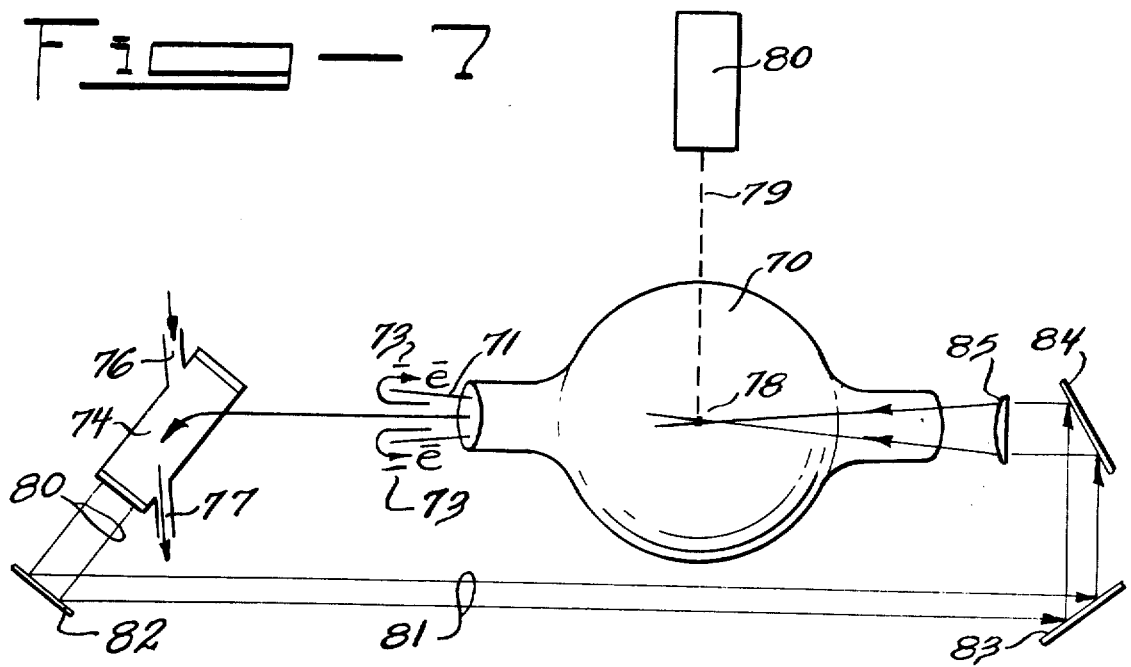
FIG. 7 shows the use of the laser to generate plasma.

Referring to FIG. 7, there is shown the method of this invention used to initiate plasma generation. A pellet supply mechanism 80, similar to that shown in FIG. 1, selectively drops solid hydrogen pellets along line 79 into a magnetic containment field 70. The pellets are made up of deuterium or deuterium and tritium. When energized, the pellet undergoes the well-known reactions:

$$D + T \rightarrow He^4 + n + 17.6 \text{ Mev.}$$
$$D + D \rightarrow He^3 + n + 3.2 \text{ Mev.}$$
$$D + D \rightarrow T + p + 4.0 \text{ Mev.}$$

The plasma generated by these reactions leaves the containment field 70 through an expander 71 as previously described. The ions are separated from the electrons by coils 73 and the ion beam 72 is directed into the laser cavity 74. The laser active medium, for example $CO_2$ gas, is inserted into the laser cavity 74 through inlet 76 and exhausts through outlet 77.

The ion beam develops a population inversion in the laser active medium to develop coherent radiation. The coherent radiation exits from the laser cavity 74 as a coherent light beam 81. The light beam 81 is reflected from mirrors 82, 83 and 84 through lens 85. The light beam 81 is developed to cover a large area so that the energy density is as low as possible. Mirrors 82–84 can be cooled if necessary.

Lens 85 acts to focus the light beam at focal point 78 to provide energy to initiate the reactions as shown in FIG. 1. While the ion laser method of FIG. 2 has been shown in connection with FIG. 7, any of the other laser pumping methods described in this specification can be used. The timing of the energization can be altered as described by changing the light path length for light beam 81. Thus the energy extracted from the laser-induced fusion of one pellet would be converted to coherent radiation and recirculated to ignite the next pellet fusion reaction. The recirculated energy would only be a fraction of the total fusion energy released per pellet, thus a net power could be extracted through conventional means.

The embodiments of the invention in which an exclusive property or privilege is claimed are defined as follows:

1. A method of pumping the laser active medium of a gas laser system with plasma from a fusion reactor to develop a population inversion in the laser active medium, including the steps of:
    a. removing the plasma from a fusion reactor with said plasma including charged particles in the form of an ion fraction and an electron fraction,
    b. mixing the laser active medium with a portion of said charged particles to pump said laser active medium and create a population inversion therein,
    c. placing said pumped laser active medium in an optical laser cavity to permit a lasing action to take place whereby coherent radiation is developed.

2. The method of pumping the laser active medium of claim 1 further including the steps of:
    a. separating the ion fraction from the electron fraction of said plasma,
    b. mixing the laser active medium with said ion fraction to pump said laser active medium and create a population inversion therein.

3. The method of pumping the laser active medium of claim 1 further including the steps of:
    a. separating the ion fraction from the electron fraction of said plasma,
    b. mixing the laser active medium with said electron fraction to pump said laser active medium and create a population inversion therein.

4. The method of pumping the laser active medium of claim 3 further including the step of:
    a. directing said ion fraction to a collector structure for direct conversion of said ions to electric energy.

5. The method of pumping the laser active medium of claim 1 further including the steps of:
    a. mixing the laser active medium with said plasma including said ion fraction and said electron fraction to pump said laser active medium and create a population inversion therein.

6. The method of pumping the laser active medium of claim 1 wherein said laser active medium is $CO_2$.

7. The method of pumping the laser active medium of claim 1 further including the steps of:
    a. separating the ion fraction from the electron fraction of said plasma,
    b. mixing said ion fraction with $D_2$ and $F_2$ to develop a chemical laser reaction in which the active laser medium is DF.

8. The method of pumping the laser active medium of claim 1 further including the steps of:
    a. separating the ion fraction from the electron fraction of said plasma,
    b. mixing said ion fraction with $H_2$ and $F_2$ to develop a chemical laser reaction in which the active laser medium is HF.

9. The method of pumping the laser active medium of claim 1 further including the steps of:
    a. separating the ion fraction from the electron fraction of said plasma,
    b. mixing said ion fraction with DF and $CO_2$ to develop a chemical laser reaction in which said $CO_2$ is the active laser medium and is pumped to develop a population inversion therein.

10. The method of pumping the laser active medium of claim 1 further including the steps of:

a. separating the ion fraction from the electron fraction of said plasma, b. mixing said ion fraction with $CS_2$ and $O_2$ to develop a chemical laser reaction in which the active laser medium is CO.

11. The method of pumping the laser active medium of claim 1 wherein the plasma is within a magnetic containment field in the fusion reactor further including the steps of:

a. placing fusionable material selected from the group consisting of D, D; D, He3; and D, T in said magnetic containment field, b. directing said coherent radiation against said fusionable material to develop a reaction producing said plasma.

* * * * *